United States Patent
Gaiser

(10) Patent No.: US 8,056,542 B2
(45) Date of Patent: Nov. 15, 2011

(54) INTAKE SYSTEM FOR A BARREL INTERNAL COMBUSTION ENGINE

(75) Inventor: Randall R. Gaiser, Dexter, MI (US)

(73) Assignee: Thomas Engine Company, LLC, Boulder, CO (US)

( * ) Notice: Subject to any disclaimer, the term of this patent is extended or adjusted under 35 U.S.C. 154(b) by 604 days.

(21) Appl. No.: 12/264,717

(22) Filed: Nov. 4, 2008

(65) Prior Publication Data

US 2009/0277413 A1 Nov. 12, 2009

Related U.S. Application Data

(60) Provisional application No. 61/052,396, filed on May 12, 2008.

(51) Int. Cl.
  *F02B 33/00* (2006.01)
  *F02B 53/00* (2006.01)
  *F02B 33/44* (2006.01)
  *F02D 23/00* (2006.01)
(52) U.S. Cl. .......... 123/559.1; 60/602; 60/611; 123/241
(58) Field of Classification Search ................. 123/56.1, 123/559.1, 560, 561, 562, 563, 564, 565; 60/602, 611
See application file for complete search history.

(56) References Cited

U.S. PATENT DOCUMENTS

| | | | | |
|---|---|---|---|---|
| 4,096,839 A * | 6/1978 | Niertit | ........................... | 123/704 |
| 4,726,343 A * | 2/1988 | Kruger | ........................... | 123/432 |
| 5,036,816 A | 8/1991 | Mann | | |
| 5,845,677 A | 12/1998 | Kim | | |
| 6,561,169 B2 * | 5/2003 | Sealy et al. | .................... | 123/563 |
| 6,817,173 B2 * | 11/2004 | Paffrath et al. | ................. | 60/293 |
| 7,367,320 B2 * | 5/2008 | Komori et al. | ................ | 123/445 |
| 2004/0006985 A1 * | 1/2004 | Wild et al. | ...................... | 60/600 |
| 2004/0128996 A1 * | 7/2004 | Klingseis | | 60/602 |
| 2007/0137199 A1 * | 6/2007 | Magner et al. | .................. | 60/602 |
| 2007/0193555 A1 * | 8/2007 | Polt | .............................. | 123/241 |

* cited by examiner

*Primary Examiner* — Thomas Denion
*Assistant Examiner* — Cameron Setayesh
(74) *Attorney, Agent, or Firm* — Gifford, Krass, Sprinkle, Anderson & Citkowski, P.C.

(57) ABSTRACT

An intake system is provided for a barrel internal combustion engine. The intake system includes a main air inlet, an intake plenum for a plurality of combustion cylinders, a first throttle, a second throttle and a control unit. The first throttle is operative to control a flow of air from the main air inlet, through a charging unit, and to the intake plenum. The second throttle is operative to control a flow of air from the air inlet to the intake plenum. The control unit controls the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

21 Claims, 3 Drawing Sheets

INTAKE SYSTEM FOR A BARREL INTERNAL COMBUSTION ENGINE

REFERENCE TO RELATED APPLICATION

This application claims priority to U.S. Provisional Patent Application Ser. No. 60/774,411, filed Feb. 17, 2006, the entire content of which is incorporated herein by reference.

FIELD OF THE INVENTION

The invention relates to an intake system for barrel-type internal combustion engines. More particularly, the invention relates to a dual-throttle arrangement that directs supercharged or normally aspirated air to the engine intake depending on operating conditions.

BACKGROUND OF THE INVENTION

Internal combustion engines are widely used for powering vehicles. Internal combustion engines include an intake manifold for receiving and directing air to a throttle, wherein the air is mixed with fuel and introduced into a cylinder and piston arrangement for combustion. The combustion causes reciprocating movement of the piston, which in turn is converted to torque usable for moving the vehicle. The products of the combustion are then expelled through an exhaust.

Supercharger and turbocharger systems (chargers) are commonly used for increasing the torque or power output of the engine. Chargers basically increase the pressure and density in the intake manifold. The increased pressure and density of air provided by the charger allows more fuel to be ignited, which results in a more powerful combustion stroke in the engine's cylinders. Superchargers are mechanically driven by the vehicle crankshaft, while turbochargers are driven by a flow of exhaust gases. Conventional charger systems, however, are typically continuously operative while the engine is running.

Accordingly, it remains desirable to provide an intake system that provides enhanced efficiency by allowing ambient operation of the engine during light loading conditions and super- or turbo-charged operation of the engine under heavy loading conditions.

SUMMARY OF THE INVENTION

According to one aspect of the invention, an intake system is provided for a barrel internal combustion engine. The intake system includes a main air inlet, an intake plenum for a plurality of combustion cylinders, a first throttle, a second throttle and a control unit. The first throttle is operative to control a flow of air from the main air inlet, through a charging unit, and to the intake plenum. The second throttle is operative to control a flow of air from the air inlet to the intake plenum. The control unit controls the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

According to another aspect of the invention, a barrel internal combustion engine includes an engine block, a plurality of pistons and an intake system. The engine block rotatably supports a drive shaft disposed along a generally centered drive axis. The engine block also has a plurality of combustion cylinders and a plurality of compressor cylinders substantially aligned with each other along respective cylinder axes. The cylinder axes are generally parallel with the drive axis. The plurality of pistons each have a combustion piston head and a compressor piston head. Each of the combustion and compressor heads is slidably engaged with respective combustion and compressor cylinders. The intake system has a main air inlet, a first intake plenum, a second intake plenum, a first throttle, a second throttle and a control unit. The first intake plenum directs air to the compressor cylinders. The first throttle is operative to control a flow of air between the main air inlet and the first intake plenum. The second intake plenum directs air to the combustion cylinders. The second throttle is operative to control a flow of air between the main air inlet and the second intake plenum. The control unit controls the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

According to another aspect of the invention, a barrel internal combustion engine includes an engine block, a plurality of pistons and an intake system. The engine block rotatably supports a drive shaft disposed along a generally centered drive axis. The engine block also has a plurality of combustion cylinders each aligned along respective cylinder axes. The cylinder axes are generally parallel with the drive axis. The plurality of pistons each have a combustion piston head slidably engaged with a respective combustion cylinder. The intake system for a barrel internal combustion engine includes a main air inlet, an intake plenum, a first throttle, a second throttle and a control unit. The intake plenum is for the combustion cylinders. The first throttle is operative to control a flow of air from the main air inlet, through a charging unit and to the intake plenum. The second throttle is operative to control a flow of air from the air inlet to the intake plenum. The control unit controls the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
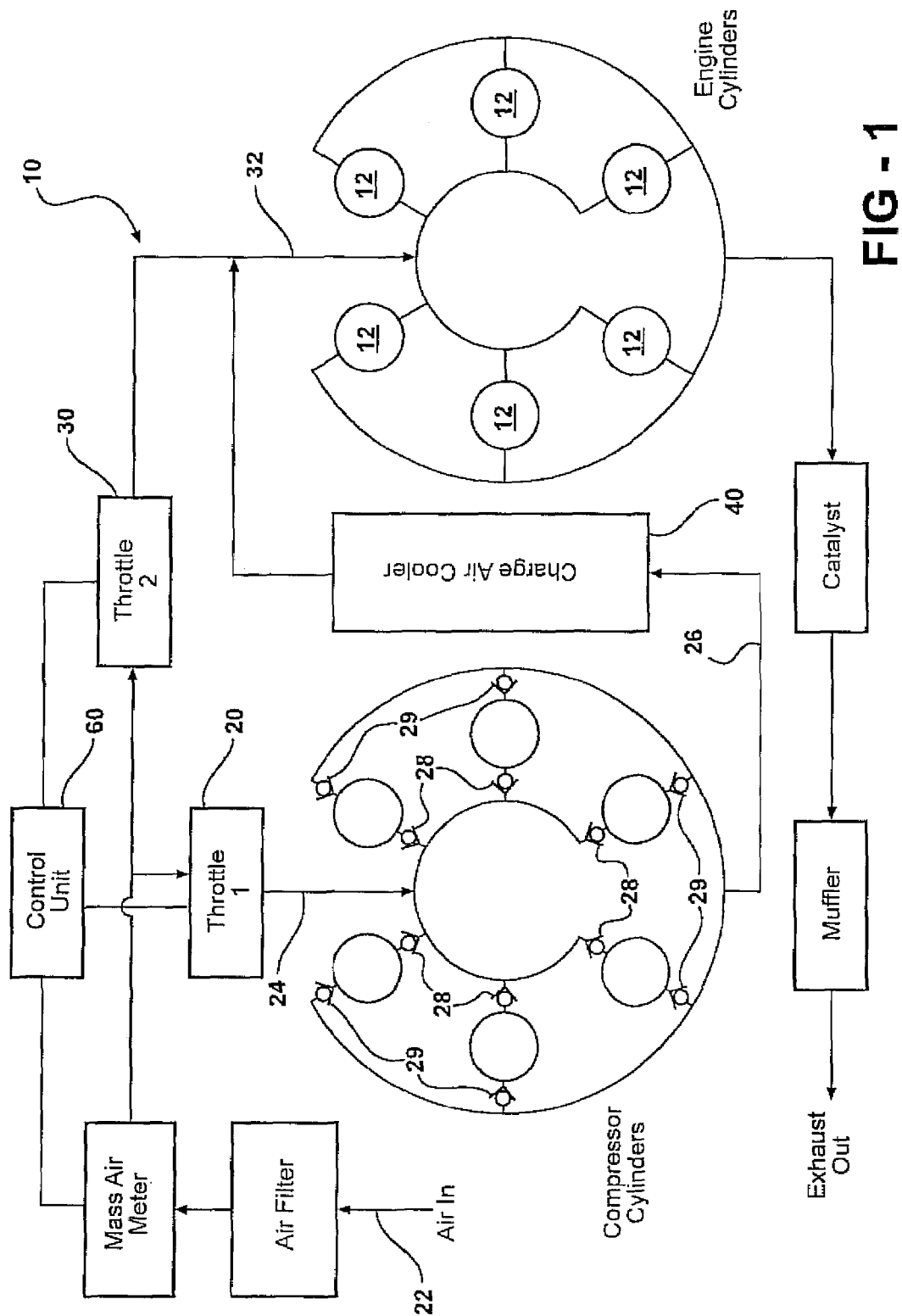
FIG. 1 is a schematic view of an intake system for a barrel-type internal combustion engine according to one embodiment of the invention.

The present invention relates to barrel internal combustion engines, such as shown in co-pending U.S. patent application Ser. Nos. 11/541,440 and 11/255,804, both of which are incorporated herein in their entirety by reference. In FIG. 1, an intake system for a barrel-type internal combustion engine is schematically shown at 10. The intake system 10 will be described in terms of a dual-ended barrel engine, wherein one end of the engine includes a plurality of combustion cylinders 12 and an opposite end of the engine includes a plurality of compressor cylinders 14. The plurality of compressor cylinders 14 functions as a blower or supercharger for boosting the pressure of the intake air for the plurality of combustion cylinders 12.

Figure 2:
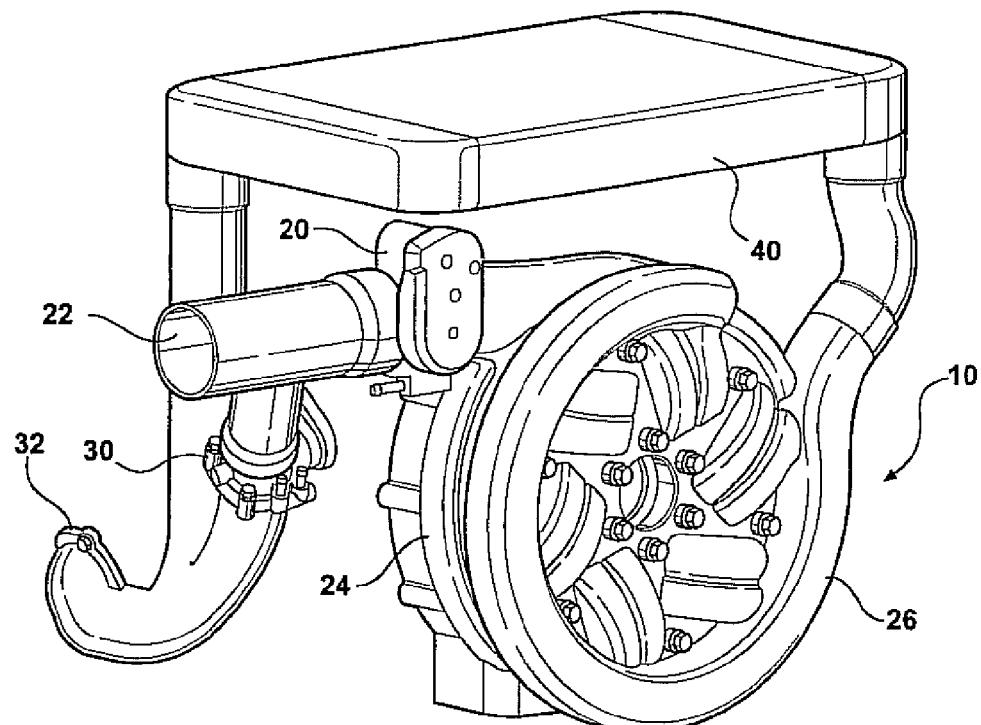
FIG. 2 is a rear perspective view of a portion of the barrel engine.
Figure 3:
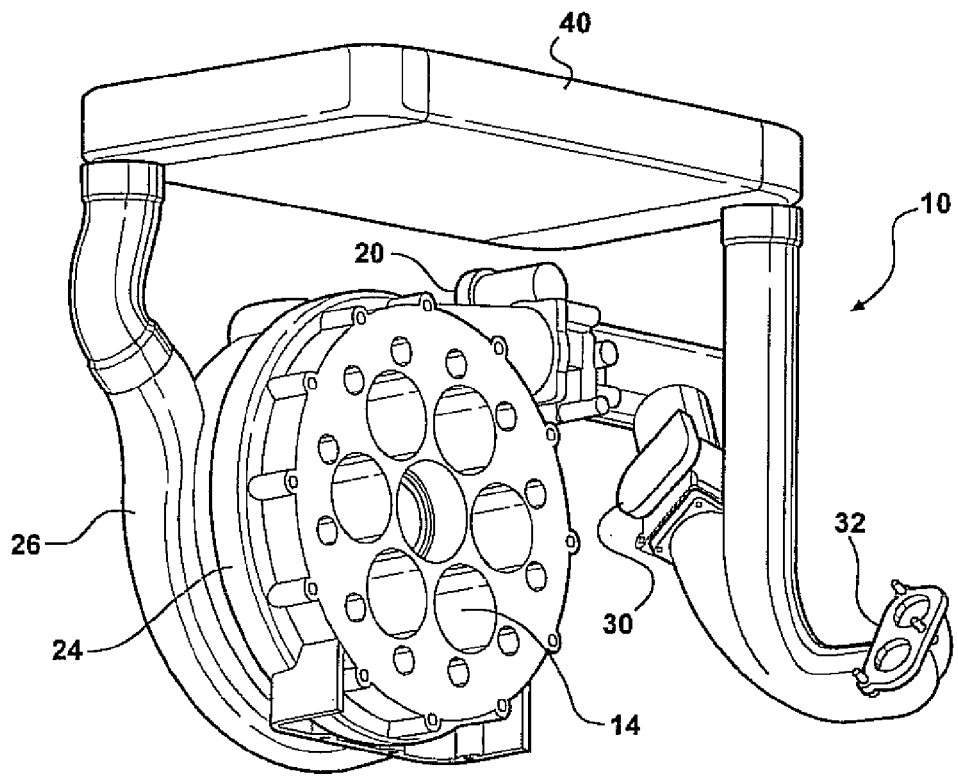
FIG. 3 is a front perspective view of a portion of the barrel engine.

Referring to FIGS. 1-3, the intake system 10 includes a first throttle 20 for controlling air flow between a main air intake 22 and an intake plenum 24 for the compressor cylinders 14. The intake system 10 also includes a second throttle 30 for controlling air flow between the main air intake 22 and an intake plenum 32 for the combustion cylinders 12. An exhaust plenum 26 directs charged or pressurized air from the compressor cylinders 14 to an air cooler 40. Air is directed from the air cooler 40 to the intake plenum 32 for the combustion cylinders. A one-way intake valve 28 is provided between each compressor cylinder 14 and the intake plenum 24. A one-way exhaust valve 29 is provided between each compressor cylinder 14 and the exhaust plenum 26.

The intake system 10 is operable in a supercharged mode or a naturally aspirated mode depending on the demand or loading conditions on the engine. A control unit 60 receives feedback from sensors indicating the demands placed on the engine and determines whether to operate the intake system 10 in the supercharged or naturally aspirated modes. Under light loading conditions, the intake system 10 is maintained in the naturally aspirated mode, wherein the second throttle 30 operates as the main throttle and the first throttle 20 functions as a shutoff valve. The first throttle 20 prevents air flow through the compressor cylinders 14 and cooler 40, thereby preventing supercharging of the air delivered to the intake plenum 32 for the combustion cylinders 12. The second throttle 30 is responsive to pedal input from the driver, directly or indirectly, and controls the flow of naturally aspirated air to the intake plenum 32 for the combustion cylinders 12. In the naturally aspirated mode, the compressor cylinders 14 operate in a vacuum, which presents a negligible loss or load to the combustion cylinders 12.

Under heavy loading condition, the intake system 10 is maintained in the supercharged mode, wherein the second throttle 30 functions as a shutoff valve and the first throttle 20 operates as the main throttle. The first throttle 20 is responsive to pedal input from the driver and controls the flow of supercharged air to the intake plenum 32 for the combustion cylinders. More specifically, air from the main air intake 22 is sucked through the first throttle 20 and directed to the compressor cylinders 14 via the intake plenum 24. A first set of one-way valves 28 prevents a backflow as the air is compressed in the compressor cylinders 14. Pressurized air is directed from the compressor cylinders 14 to the air cooler 40 via the exhaust plenum 26. A second set of one-way valves 29 prevents backflow between the exhaust plenum 26 and the compressor cylinders 24. Supercharged air is directed from the air cooler 40 to the intake plenum 32 for combustion in the combustion cylinders 12.

Figure 4:
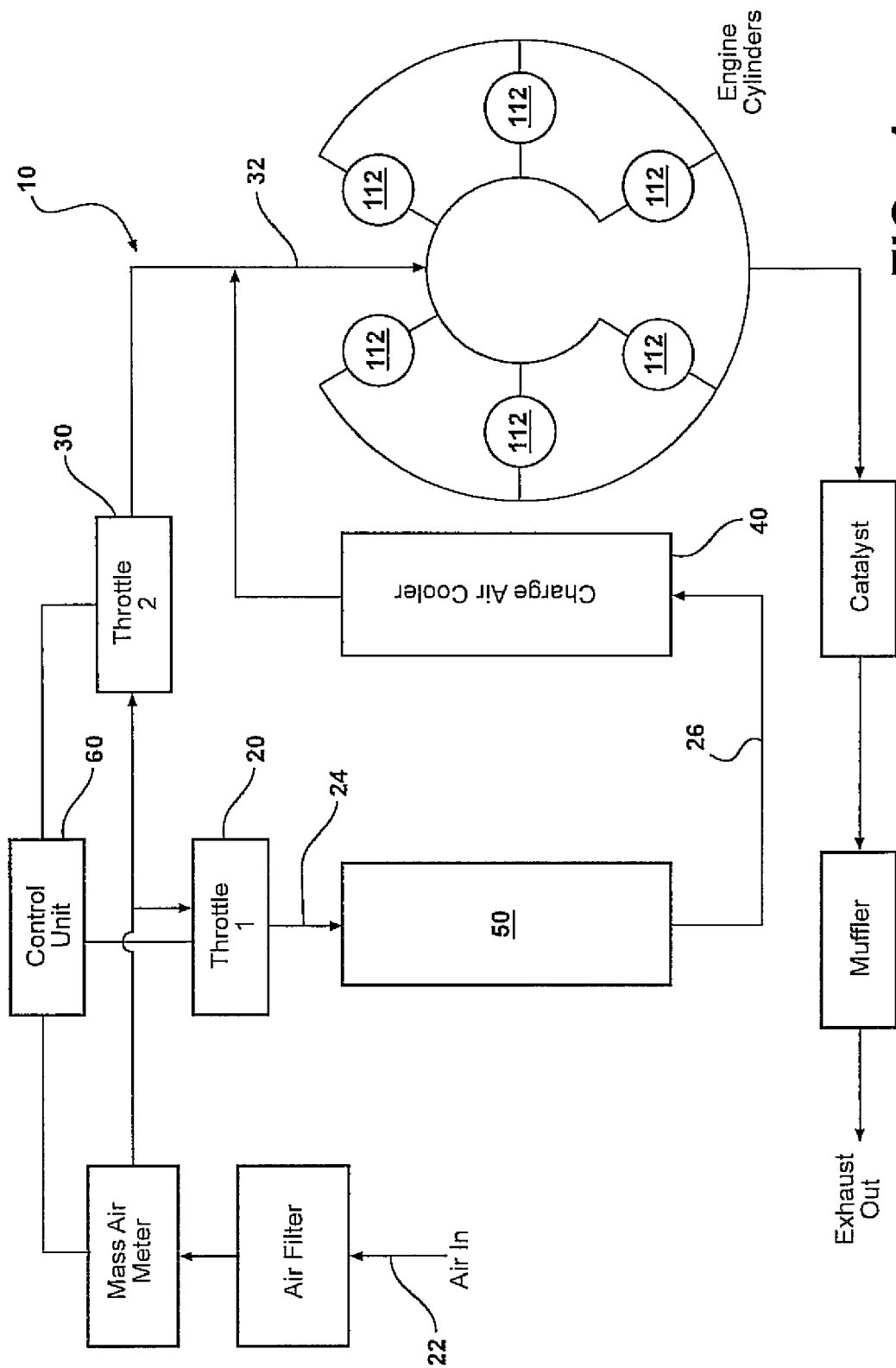
FIG. 4 is a schematic view of the intake system according to a second embodiment of the invention.

In FIG. 4, the intake system 10 according to a second embodiment of the invention is shown for use with a single ended barrel engine. The single ended engine includes a plurality of combustion cylinders 112. The intake system 10 in this embodiment utilizes an external charging unit 50 instead of the bank of compressor cylinders from the previous embodiment. The charging unit 50 may be provided as a supercharger or a turbocharger.

While it is preferred that the first throttle 20 is upstream of the charging unit in each embodiment, the throttle may be positioned downstream. However, this causes the charging unit to compress air against the closed throttle, leading to increased load. As another alternative, the control unit may control both throttles in a blended mode where some compressed or pressurized air is mixed with non-pressurized air, as needed. An additional throttle or one way valve may be useful in such a configuration.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. An intake system for a barrel internal combustion engine comprising:
    a main air inlet;
    an intake plenum for a plurality of combustion cylinders;
    a first throttle operative to control a flow of air from the main air inlet, through a charging unit, and to the intake plenum;
    a second throttle operative to control a flow of air from the air inlet and to the intake plenum; and
    a control unit for controlling the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

2. An intake system as set forth in claim 1, wherein the charging unit is a turbocharger.

3. An intake system as set forth in claim 1, wherein the charging unit is a supercharger that is mechanically driven by the plurality of combustion cylinders.

4. An intake system as set forth in claim 3, wherein the supercharger is provided in the form of a plurality of compressor cylinders, each compressor cylinder being coupled to a respective combustion cylinder, each compressor cylinder compressing the intake air during an expansion stroke of the respective combustion cylinder.

5. An intake system as set forth in claim 4 including a first plurality of valves preventing a backflow of air from the charging unit as air is compressed in the compressor cylinders.

6. An intake system as set forth in claim 5, wherein compressed air is displaced from the compressor cylinders to an exhaust plenum.

7. An intake system as set forth in claim 6 including a second plurality of valves preventing a backflow of air between the compressor cylinders and the exhaust plenum.

8. An intake system as set forth in claim 7 including an air cooler for cooling the compressed air as it flows between the exhaust plenum of the compressor cylinders and the intake plenum for the combustion cylinders.

9. A barrel internal combustion engine comprising:
    an engine block rotatably supporting a drive shaft disposed along a generally centered drive axis, the engine block also having a plurality of combustion cylinders and a plurality of compressor cylinders substantially aligned with each other along respective cylinder axes, the cylinder axes being generally parallel with the drive axis;
    a plurality of pistons each having a combustion piston head and a compressor piston head, each of the combustion and compressor heads being slidably engaged with respective combustion and compressor cylinders; and
    an intake system having:
        a main air inlet;

a first intake plenum for directing air to the compressor cylinders; a first throttle operative to control a flow of air between the main air inlet and the first intake plenum;

a second intake plenum for directing air to the combustion cylinders;

a second throttle operative to control a flow of air between the main air inlet and the second intake plenum; and a control unit for controlling the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

10. A barrel internal combustion engine as set forth in claim 9 including an exhaust plenum directing compressed air between the combustion cylinders and the second intake plenum.

11. A barrel internal combustion engine as set forth in claim 10 including an air cooler disposed between the exhaust plenum and the second intake plenum for cooling the compressed air.

12. A barrel internal combustion engine as set forth in claim 10 including a first plurality of valves preventing a backflow of air from the compressor cylinders to the first intake plenum.

13. A barrel internal combustion engine as set forth in claim 12 including a second plurality of valves preventing a backflow of air from the exhaust plenum to the compressor cylinders.

14. A barrel internal combustion engine as set forth in claim 9, wherein the first intake plenum is generally annular shaped.

15. A barrel internal combustion engine as set forth in claim 10, wherein the exhaust plenum is generally annular shaped.

16. A barrel internal combustion engine comprising:

an engine block rotatably supporting a drive shaft disposed along a generally centered drive axis, the engine block also having a plurality of combustion cylinders each aligned along respective cylinder axes, the cylinder axes being generally parallel with the drive axis;

a plurality of pistons each having a combustion piston head slidably engaged with a respective combustion cylinder; and an intake system having:

a main air inlet;

an intake plenum for the combustion cylinders;

a first throttle operative to control a flow of air from the main air inlet, through a charging unit, and to the intake plenum;

a second throttle operative to control a flow of air from the air inlet and to the intake plenum; and a control unit for controlling the operation of the first and second throttles in supercharged or normally aspirated modes, where the first throttle operates as a main throttle and the second throttle is closed in the supercharged mode, and where the first throttle is closed and the second throttle operates as the main throttle in the naturally aspirated mode.

17. A barrel internal combustion engine as set forth in claim 16, wherein the charging unit is a turbocharger.

18. A barrel internal combustion engine as set forth in claim 16, wherein the charging unit is a supercharger that is mechanically driven by the plurality of combustion cylinders.

19. A barrel internal combustion engine as set forth in claim 18, wherein the supercharger is provided in the form of a plurality of compressor cylinders, each compressor cylinder being coupled to a respective combustion cylinder, each compressor cylinder compressing the intake air during an expansion stroke of the respective combustion cylinder.

20. A barrel internal combustion engine as set forth in claim 19, wherein compressed air is displaced from the compressor cylinders to an exhaust plenum.

21. A barrel internal combustion engine as set forth in claim 20 including an air cooler for cooling the compressed air as it flows between the exhaust plenum of the compressor cylinders and the intake plenum for the combustion cylinders.

\* \* \* \* \*